United States Patent [19]

Stobbe et al.

[11] Patent Number: 5,218,343
[45] Date of Patent: Jun. 8, 1993

[54] PORTABLE FIELD-PROGRAMMABLE DETECTION MICROCHIP

[75] Inventors: Anatoli Stobbe, Steinradweg 3, D-3013 Barsinghausen 1; Wilfried Herrmann, Gehrden, both of Fed. Rep. of Germany

[73] Assignee: Anatoli Stobbe, Barsinghausen, Fed. Rep. of Germany

[21] Appl. No.: 650,490

[22] Filed: Feb. 5, 1991

[30] Foreign Application Priority Data

Feb. 5, 1990 [DE] Fed. Rep. of Germany ....... 4003410

[51] Int. Cl.⁵ .............................................. G08B 21/00
[52] U.S. Cl. .................................... 340/572; 340/505; 340/825.34; 340/870.24; 340/870.31
[58] Field of Search .................... 340/572, 505, 825.34, 340/870.24, 870.31

[56] References Cited

U.S. PATENT DOCUMENTS

| | | | |
|---|---|---|---|
| 3,944,928 | 3/1976 | Augenblick et al. | 340/572 |
| 4,384,288 | 5/1983 | Walton | 340/825.34 |
| 4,924,210 | 5/1990 | Matsui et al. | 340/572 |
| 5,036,308 | 7/1991 | Fockens | 340/572 |
| 5,099,226 | 3/1992 | Andrews | 340/505 |
| 5,105,190 | 4/1992 | Kip et al. | 340/572 |

Primary Examiner—Glen R. Swann, III
Attorney, Agent, or Firm—Collard & Roe

[57] ABSTRACT

A read/write device includes a transmitter for producing an RF signal and a modulator coupled to said transmitter for modulating the RF signal and, finally a data receiver for receiving RF data signals from a portable microchip. The microchip includes a resonant circuit tuned to the RF frequency of the read/write transmitter and a receiver that is coupled to the resonant circuit for detecting the RF signal. There is also provided a charging capacitor capable of storing the electrical energy from the RF signal so that the microchip can be powered during pulse pauses of the RF signal. The microchip includes a memory circuit for storing the identification code of the microchip, and a code generator that is coupled to the memory circuit for generating an RF signal that is modulated with the identification data. A switching element that couples the resonant circuit to the code generator de-tunes the resonant circuit when the identification data is transmitted back to the read/write device. The same resonant circuit also serves to field program the memory circuit of the microchip by receiving pulse pause modulation signals (PPM) of the RF carrier signal thus allowing the identification code of the microchip to be altered by the read/write device.

8 Claims, 5 Drawing Sheets

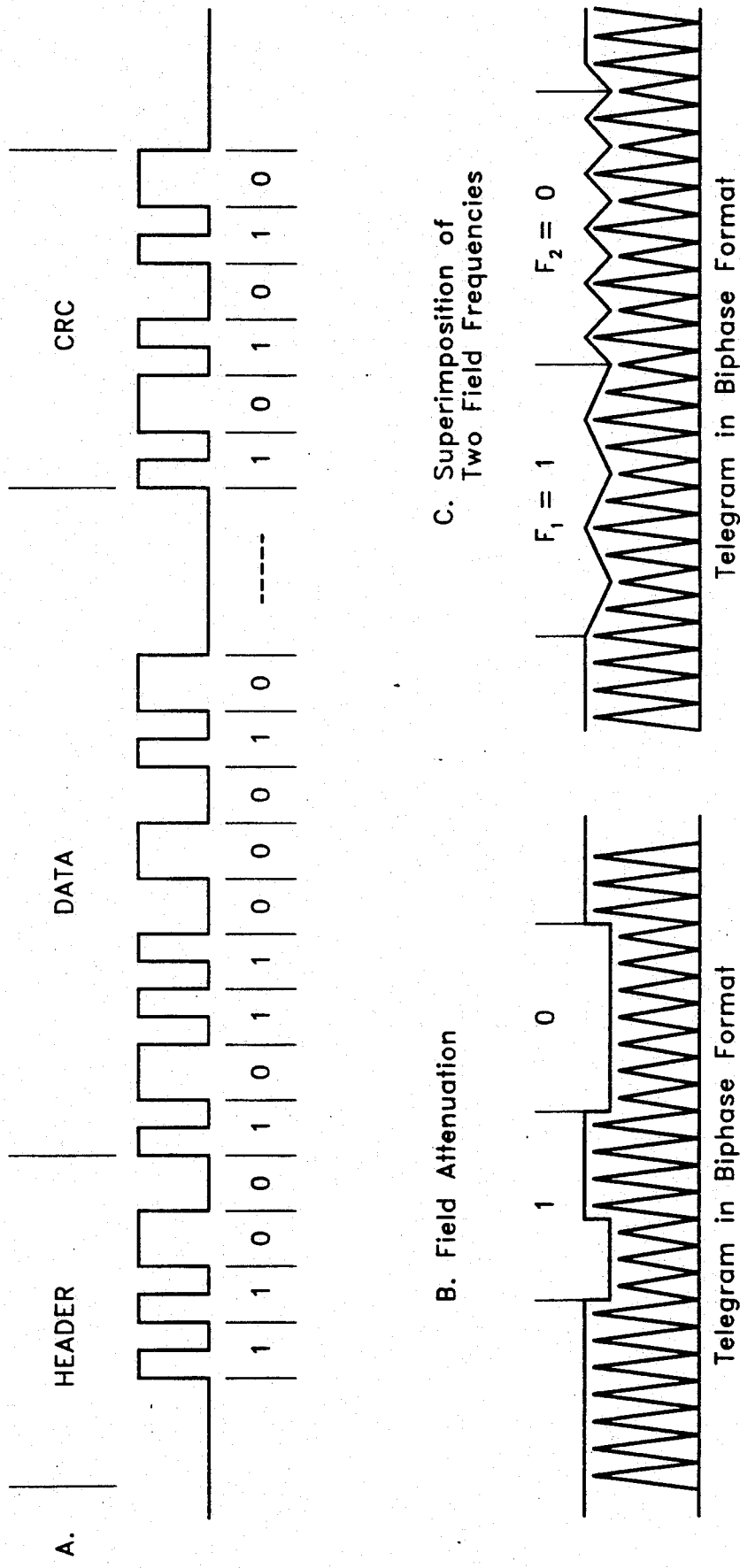

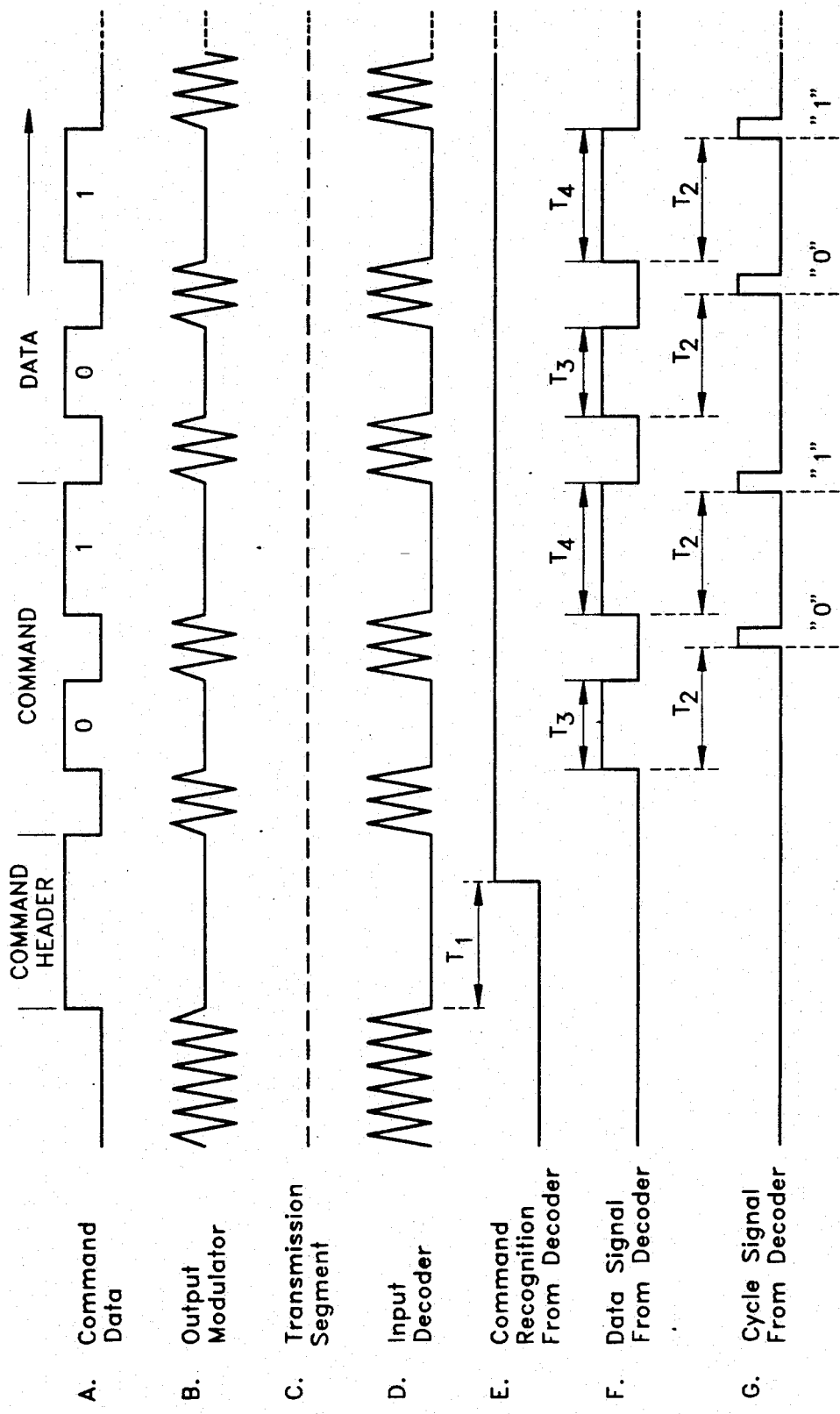

PORTABLE FIELD-PROGRAMMABLE DETECTION MICROCHIP

BACKGROUND OF THE INVENTION

This invention relates to a portable field-programmable detection microchip capable of storing identification data.

Presently, in production processes that are automated, electronic identification technologies are in great demand. In these processes, either only a number is transmitted (read only), or variable data can even be stored, which is programmable at a distance (read/write). These portable data carriers or "detection microchips" are implanted, for example, under the skin of valuable horses, in order to identify them with certainty. Also, cows, pigs and other livestock can receive implants to control automatically operating animal feed systems, and/or to store all the data relating to the animals, from their birth and onward.

In automated production lines, painting lines are equipped with microchip devices so that cars can be painted the correct color, depending on the programming. In industrial conveyor systems, robots can receive certain types of screws or hardware which are packed into a universal container in the warehouse and shipped to the robots by an appropriate program provided to the detection microchip.

The spread of such technologies is greatly influenced by the price of the data carrier, since large numbers of them are required.

An advantageous low price, a high life expectancy and a small size are mainly achieved with battery-free detection microchips. Many different applications can be implemented with a "read-only" system, but the possibility of being able to change the data content of detection microchips opens up many new applications for using the chips for the present, and in the future.

Basically, all battery-free devices have a number of features in common. An RF transmitter forming part of a read/write device is generally used to radiate an electromagnetic field via an antenna. When the chip enters this field, the detection microchip receives energy from the RF field and begins transmitting its stored data. The timing system cycle for the circuit of the detection microchip is often generated by dividing the frequency of the RF field. This results in a data read-out of the data memory circuit and a field-synchronous attenuation of the RF field by a special switching of the serial data flow. This attenuation is outputted, amplified, and digitally re-processed at the receiver of the read/write device. In return, it is possible, with read/write systems, to modulate the RF transmitter, and to transmit data to the detection microchip over a distance.

Moreover, it is also possible to change the memory contents of the detection microchip after it is packaged within a sealed enclosure, without physical contact. This will allow many more areas of use for this technology other than simple identification. For example, a few areas include cash-free payment transactions, tool management, conveyor systems, motor vehicle data. Reprogrammable detection microchips would also be particularly useful for storing personal data on customers or patients where the data has to be updated periodically.

PRIOR ART DEVICES

Contact-free programming using conventional detection microchips may require the chips to have several field coils for energy transmission, data transmission and/or synchronization. The spatial distances needed for programming are only a few millimeters. Thus, the detection microchip is usually laid directly onto the programming device. The type of modulation used is usually FSK, since this is easy to decode with a PLL circuit. In order to minimize circuitry expenses, the programming process is usually synchronized by the field frequency.

The prior art devices have many disadvantages, especially if they use multiple coils for contact-free programming. In contact-free programming, 2–3 coils are usually needed for reception, synchronization, data transmission, and energy transmission. It is impossible to produce inexpensive and especially small detection microchips with these requirements. The size of the chip is a particularly decisive factor for tool recognition or animal implants. Moreover, the use of more than one coil often makes it necessary to spatially position the coils correctly relative to the read/write unit. Thus, due to this restriction, multiple coil systems are not suitable for many chip applications.

When data is decoded within the detection microchip, analog, current-consuming decoding methods are used such as FSK or PLL demodulation. This makes it impossible to conduct true field programming, or programming over larger distances. The current required can only be transmitted to the chip over very short distances, such as in the mm range. This restriction is particularly disadvantageous in the computer integrated mode (CIM) area, since precise positioning is often not possible. The systems used which are connected to batteries, are much more expensive, but the read/write distance can be extended to the range of 5–10 cm. The same requirements must also be fulfilled by the battery-free system described here.

The use of the field frequency to produce the timing cycle for the data pulse rate, is obvious, and thus eliminates the need for an oscillator. However, this blocks out the possibility of programming the detection microchip using AM modulation, since the RF field is shut off for this, and, thus, no system timing cycle is present.

OBJECT OF THE INVENTION

It is therefore an object of the present invention to provide a portable, field-programmable detection microchip for use as an identification device, that permits the contact-free exchange of data, and which can be reprogrammed in the field.

According to the invention, there is provided a detection microchip that uses a resonant circuit for receiving modulated input signals from a read/write device so that the chip decoder can be controlled by PPM coded switching signals. Therefore data can be written into the memory circuit of the microchip by an external read/write device in the field. In order to be able to make the detection microchip small and inexpensive, only a single coil is used for field programming, transmitting data, and supplying energy, according to the invention.

In field programming, commands and data are mixed by AM modulation, according to the invention, and transmitted to the detection microchip with pulse pause modulation (PPM). The form of the data transmission, and the decoding circuit used with the detection microchip, which operates only digitally, according to the invention, together with a supporting power capacitor, allows field programming to take place even over distances of 5-10 cm. The heart of the decoding circuit includes several counters, as well as an oscillator, which serves as a field-independent time reference.

U.S. Pat. No. 3,299,424 discloses an identification device with a detection microchip, and having resonant circuit which withdraws energy from the RF field of the transmitter in a tuned state, and therefore has a measurable retro-effect on the RF transmitter.

In German Patent DE 2748584, an identification device is known which uses the characteristics of U.S. Pat. No. 3,299,424 and combines them with the advantages of obtaining the supply voltage from the resonant circuit. Obtaining energy from an induction loop is also already known from DE-AS 1219990.

In the applicant's earlier issued U.S. Pat. No. 4,801,768, a checking system is disclosed using a data collector that is passed over one or more data carriers without making contact. Each of the carriers contain a magnet which switches on the sensing circuit of the data collector so that it can detect the magnetically or infrared pre-coded strips of the carrier. No RF transmitted or received signals are used to decode the data carrier, and the possible combinations of data stored in the carrier are limited. Moreover, in this device, it is not possible to electronically reprogram the data stored in the carrier when needed.

None of the three patents mentioned above disclose the use of the same resonant circuit for both providing energy and transmitting data, and also allowing for contact-free programming or changing of the data in the detection microchip. This is a unique feature, particularly in view of the fact that during the programming process, very little energy is transmitted to the detection microchip. Moreover, much more energy is needed for a conventional decoding circuit (PLL, FSK, etc.) as well as for programming the memory circuit than for transmitting data. The present invention therefore provides a detection microchip that includes a simple, space-saving circuit arrangement, which can be easily programmed over relatively large distances.

Other objects and features of the present invention will become apparent from the following detailed description, considered in connection with the accompanying drawings which disclose the embodiments of the invention. It is to be understood, however, that the drawings are designed for the purpose of illustration only, and not as a definition of the limits of the invention.

BRIEF DESCRIPTION OF THE DRAWINGS

In the drawings, wherein similar reference characters denote similar elements throughout the several views:

FIGS. 4A-4C show a data telegram from the detection microchip to the read/write device; and FIGS. 5A-5C show a data telegrams from the read/write device to the detection microchip according to the invention.

DETAILED DESCRIPTION OF THE INVENTION

Figure 1:
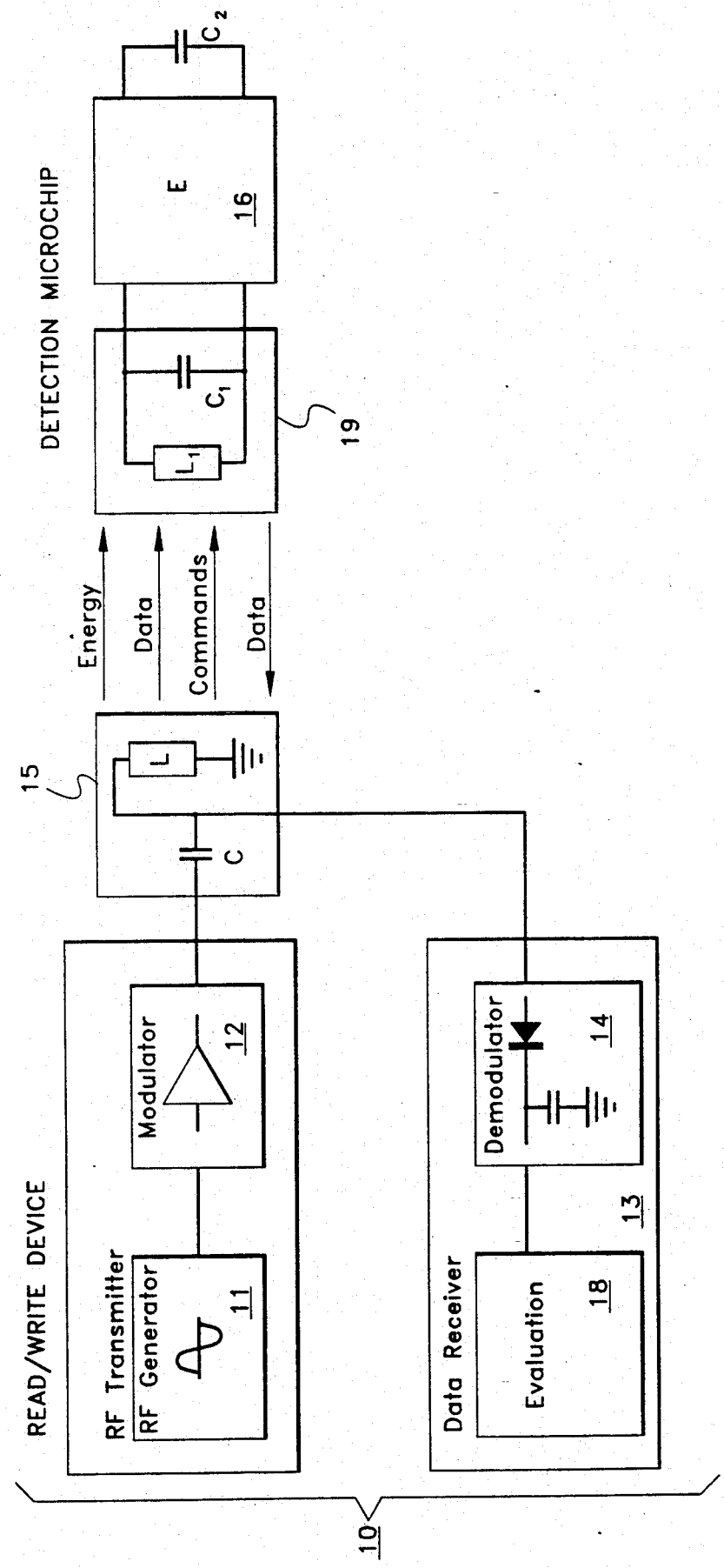
FIG. 1 shows a schematic representation of the combination read/write device/detection microchip according to the invention.

Referring to FIG. 1, there is shown a read/write device 10 according to the invention, which consists of a RF transmitter 11 with a modulator 12 and a data receiver 13 having a demodulator 14. The RF transmitter generates a quartz-stabilized frequency, which is guided into a resonant circuit 15 serving as an antenna, in order to be able to radiate an RF field. The RF field is modulated by modulator 12 using field attenuation, so that AM pulse pause modulation is performed on the RF field, for transmitting data to a detection microchip 16.

Data receiver 13 is also connected to resonant circuit 15. Receiver 13 demodulates the field attenuated signal of the detection microchip 16 and subsequently evaluates the chip in order to recognize the number or code of detection microchip 16.

Four different entities are transmitted using the same RF field: energy, commands and data transmitted to detection microchip 16. Moreover, data is transmitted from resonant circuit 19 of the detection microchip 16 to resonant circuit 15, and detected by demodulator 14 of data receiver 13. Its evaluation circuit 18 is connected to demodulation 14 and thus evaluates the data received from microchip 16.

Figure 2:
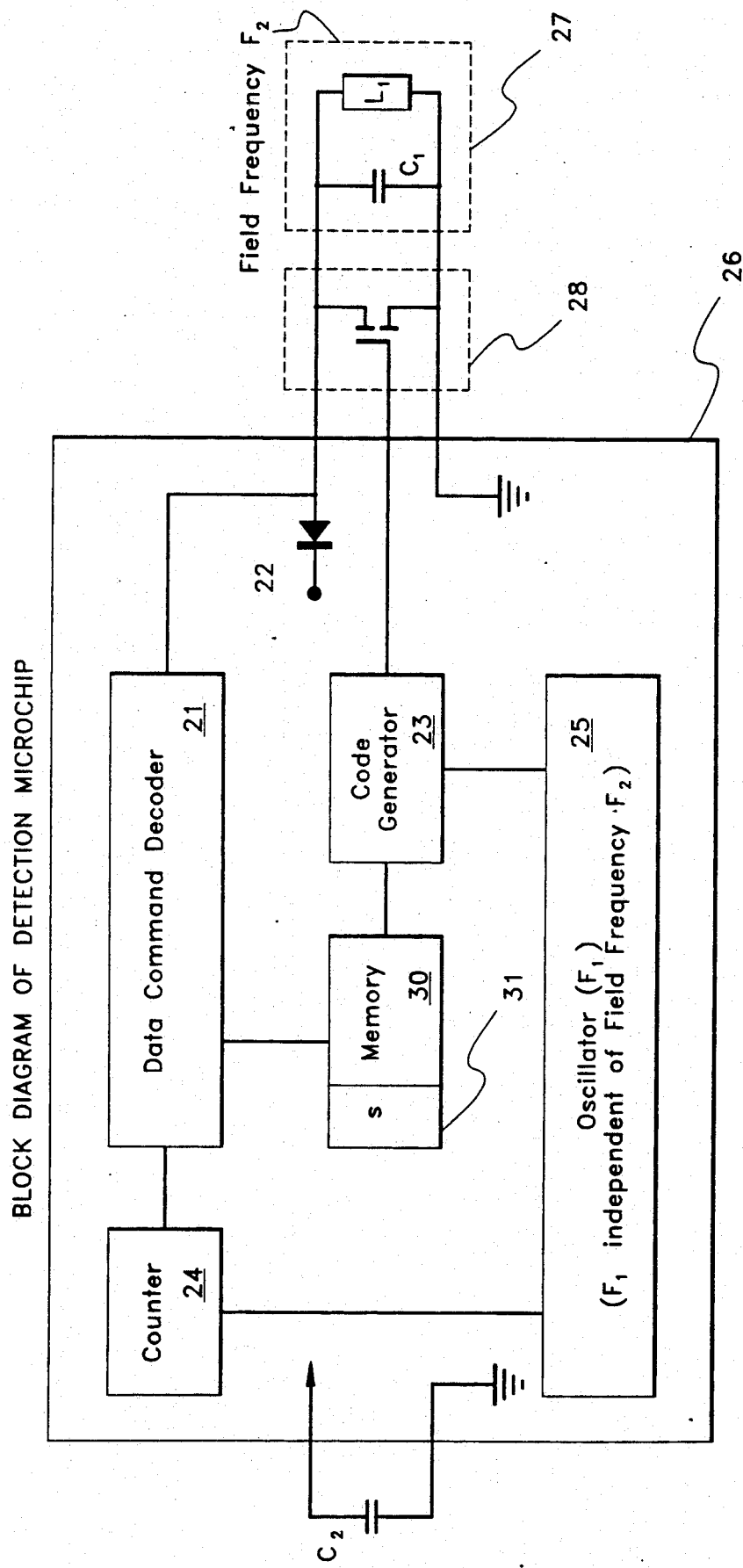
FIG. 2 is a block diagram of a detection microchip.

Referring to FIG. 2, there is shown a detection microchip 26 (similar to microchip 16) in which there is provided a resonant circuit 27, consisting of a coil $L_1$ and a capacitor $C_1$. The resonance frequency of the circuit is set or tuned to correspond to the frequency of the electromagnetic field prevailing in a detection zone. If detection microchip 26 is brought into the detection zone, resonant circuit 27 will oscillate due to the presence of the detection field. This causes an alternating voltage to be generated in the LC circuit, where coil $L_1$ and capacitor $C_1$ are connected in parallel in this example. The alternating voltage is then coupled to chip 26 via a rectifier 22.

On chip 26, there is also provided an oscillator 25, which controls a code generator 23. A counter 24 is coupled to a decoder 21. Decoder 21 is coupled to a memory circuit 30, in which there is stored a preset data code. Memory circuit 30 communicates both with code generator 23 and decoder 21.

During the read-out process, which is initiated after detection microchip 26 is inserted into the RF field, code generator 23 processes the data stored in memory circuit 30 and transmits that data to the read/write device (10) in modulated form, by de-tuning or changing the impedance of resonant circuit 27 via a switching element 28. During the programming process, decoder 21, together with counter 24 and oscillator 25, evaluates the modulation signal received from the read/write device, and then programs the data into memory circuit 30. The "S" or write protected area 31 of memory circuit 30 is designed to be programmed only once, so that the memory can include non-erasable portions for technical reasons.

Capacitor $C_2$ is used as a buffer or power charging capacitor, in order to allow programming pulses for the memory circuit 30, even when a constant supply of power from the modulated RF field is not possible. Furthermore, the stored power in capacitor $C_2$ is needed to guarantee that decoder 21, with counter 24 and oscillator 25 will function during the pauses between pulse signals. Moreover, capacitor $C_2$ also insures that the entire chip 26 will function properly, since the field is turned off at times during the programming process.

Figure 3:
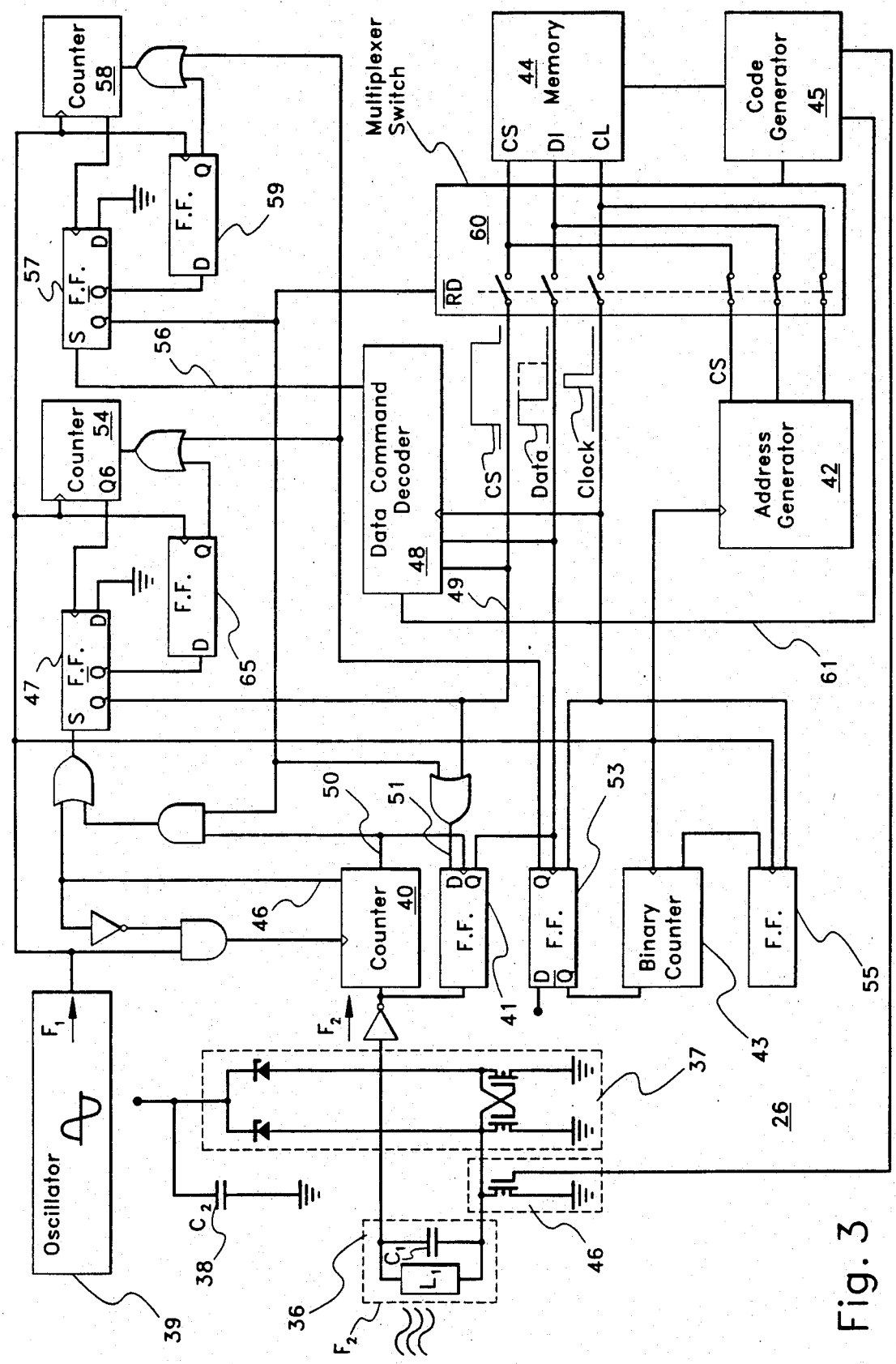
FIG. 3 is a wiring diagram of the decoding logic according to the invention in the detection microchip.

Referring to FIG. 3, there is shown a functional schematic block diagram of a detection microchip. When detection microchip 26 is inserted into an RF field with a field frequency $F_2$, energy is supplied to the chip by means of a resonant circuit 36, rectifier circuit 37, and charging capacitor 38. An oscillator 39 supplies the clock or system timing frequency $F_1$, independent of the field frequency $F_2$. The field frequency $F_2$ when applied, keeps a counter 40 and a flip-flop 41 in the reset state. An address generator 42 generates the data addresses by means of two binary counters 40 and 43 and causes memory 44 to read-out. A shift register, located in address generator 42, converts parallel data into a serial data flow.

A code generator 45 converts the serial data flow into known, serial data formats (FSK, BIPHASE) (see FIG. 4A-4C) and effects data transmission by field modulating using the switching element 46.

During the field programming phase of detection microchip 26, support capacitor $C_2$ and oscillator 39, maintain the system clock $F_1$ and the supply voltage of detection microchip 26 during the time when the RF field is shut-off due to the AM and data signals. The programming process begins when the RF field is shut off for a time slightly longer than the time $T_1$ (see FIG. 5, part E).

Since counter 40 is now no longer reset (and the system clock from oscillator 39 continues to run), counter output 46 goes "high" after $T_1$, trips flip-flop (FF) 47, and stops itself. The set FF 47 now opens a command decoder 48 with a CS signal on line 49. The "high" level of the CS signal is also applied to an input 51 of flip-flop FF 41. After time $T_1$, the RF field is turned on again, thereby resetting counter 40 and recharging capacitor $C_2$.

If the RF field is then turned off again, the first "high" level of an output 50 of counter 40 then trips FF 41 (FF 41 is not tripped without a CS signal). This "high" level at the output of FF 41 reaches the command decoder 48 as a data signal and also trips flip-flop FF 53. This flip-flop, in turn, releases counters 43 and 54. A flip-flop FF 65 is connected to one output of FF 47, and has an output connected to an input of counter 54 through a coupling circuit. Flip-flop FF 65 also has its timing input connected to oscillator 39, as shown. Counter 43, with the help of flip-flop FF 55, produces the clock signal for command decoder 48 after the expiration of time $T_2$ (see FIG. 5, part G). Depending on whether the RF field is shut off for the time period of $T_3$ or $T_4$ (see FIG. 5, part F), command decoder 48 provides a data-H or data-L (PPM) with the clock signal. The clock signal also resets FF 53, counter 43 and FF 55. The first data that is transmitted in this way are commands to command decoder 48 (see FIG. 5, part A), which sets detection microchip 26 into the following mode on the basis of these commands:

1. The Program Memory Mode

After recognizing the programming command, command decoder 48 trips FF 57 and releases a counter 58 by means of FF 59. A multiplexer 60 is also switched over by FF 57, and passes all CS, data and clock signals subsequently transmitted to memory circuit 44. This writes the transmitted data into the memory of circuit 44.

Every data signal transmitted causes counters 54 and 58 to reset so that the duration of the CS signal (counter 54), i.e. the programming (multiplexer switching 60, counter 58) is extended until no further data is transmitted. Detection microchip 27 then immediately goes back to its read-out mode.

2. The Stop Read-Out Mode

After recognizing the stop command, command decoder 48 stops the modulation of the RF field via line 61 connected to code generator 45. The stop command allows the read/write device to shut off detection microchip 26 immediately after its recognition using the RF field, and to recognize additional detection microchips that enter into the RF field.

3. The Read-Out Memory Mode

The read-out command is the reverse of the stop command (code generator 45 is released via the line 61) and is transmitted if a detection microchip which was previously shut off is supposed to be reactivated. Of course, additional commands are also possible, depending on the area of use of the detection microchip.

4. The Setting Function Mode

There is also a function mode register on the detection microchip, which is automatically loaded with the data bits of the first memory address when the detection microchip enters the RF field. The following function modes are set with these data bits: Baud rate, single-phase modulation, dual-phase modulation, field-synchronous and field-asynchronous data transmission, binary format, biphase format, FSK format, FSK frequencies, memory size, read/write mode, read-only mode, etc. Since the memory contents can be changed or programmed via the RF field, it is possible to re-program the detection microchip from one function mode to another at any time.

FIG. 4A shows a data telegram which is transmitted from the detection microchip to the read/write device. The telegram begins with a header, which is required to recognize the detection microchip, followed by the actual data, and a cyclic redundancy check (CRC) check at the end. For the code structure, various self-cycling codes can be selected, such as biphase, Manchester, etc. The transmission of 0 and 1 bits can take place by attenuation of the field (see FIG. 4B) or by superimposing two frequencies (see FIG. 4C), or by other types of modulation.

FIG. 5 shows data telegrams from the read/write device to the detection microchip. In order to be able to program the detection microchip, first a command header is sent, followed by a command and the actual data, as shown in line A. Some of the possible commands are:

1. Write data
2. Read data
3. Start data transmission
4. Stop data transmission

The modulator of the read/write device attenuates the field of the RF generator and generates the pulse pause signal (PPM) in resonant circuit 15 of FIG. 1, (see line B of FIG. 5). This modulated RF field is now transmitted to detection microchip 26 via the transmission segment (see line C of FIG. 5). The data transmitted by resonant circuit 15 results in time-proportional data at resonant circuit 36, respectively at the input of decoder device of detection microchip 26, formed by the counters, flip-flops, etc. mentioned above (see line D of FIG. 5).

After a time $T_1$, decoder 48 produces the command recognition signal (CS signal) (see line E of FIG. 5). On the basis of the PPM signals transmitted ($T_3$ and $T_4$), decoder 48, after command recognition, and with the help of counter 43, after $T_2$, generates clock and data signals for carrying out the various commands (see lines F and G of FIG. 5).

In this manner, both commands (as under line A of FIG. 5) and data are transmitted to detection microchip 26 from read/write system 10.

While only a few embodiments of the present invention has been shown and described, it is to be understood that many changes and modifications may be made thereunto without departing from the spirit and scope of the invention as defined in the appended claims.

What is claimed is:

1. The combination of a portable, field-programmable detection microchip for storing identification data for identifying persons, animals or objects, and a read/write device for accessing the data stored in the microchip, when brought within RF coupling proximity thereof, the combination defining an identification system comprising:

a read/write device including a transmitter for producing an RF field, a pulse pause modulator coupled to said transmitter for modulating the RF field during the field programming mode, said pulse pause modulator providing different function modes, such as band rate, single-phase modulation, dual-phase modulation, field synchronous and field-asynchronous data transmission, binary format, biphase format, FSK format, FSK frequencies, memory size, read/write mode, read-only mode, said modes being transmitted by said read/write device to the detection microchip via the RF field and a data receiver for receiving RF data signals from the detection microchip; and a detection microchip including a resonant circuit tuned to the frequency of said RF field, a charging capacitor coupled to said resonant circuit for storing electrical energy during the occurrence of the RF field, and powering said microchip during pulse pauses of the RF field, a signal receiver coupled to said resonant circuit for decoding the modulated RF field, including a decoder circuit, a memory circuit for storing the identification data of said microchip, a code generator coupled to said memory circuit for generating an RF signal modulated with the identification data, an oscillator coupled to both said code generator and said decoder circuit for providing a field-independent time reference to said detection microchip, and switching means coupled to said resonant circuit and said code generator for coupling the identification data from said code generator to said resonant circuit, said switching means changing the impedance of said resonant circuit during the transmission of the identification data, wherein the same resonant circuit is used to provide the energy for the detection microchip, further to transmit data to the read/write device and to receive commands and data for reprogramming from the read/write device.

2. The combination as recited in claim 1, wherein said read/write device additionally comprises means for field programming the memory circuit of said microchip by using said modulator for pulse pause modulating (PPM) said RF field, so that said RF field includes data and command signals for changing the identification data stored in the memory circuit of said microchip.

3. The combination as recited in claim 1, wherein said signal receiver of said microchip additionally comprises a decoder circuit coupled to said memory circuit, said decoder receiving a pulse pause modulated (PPM) RF field from said modulator of said read/write device for digitally evaluating the PPM RF field and the data in order to change the identification data stored in said memory circuit.

4. The combination as recited in claim 3, wherein said memory circuit of said detection microchip additionally comprises a write protected area which can only be written onto once with data.

5. The combination as recited in claim 4, wherein said oscillator of said detection microchip operates at a frequency independent of the frequency of the RF signal from the transmitter of the read/write device.

6. The combination as recited in claim 5, wherein said data receiver of said read/write device comprises a demodulator, and an evaluation circuit coupled to said demodulator for evaluating and indicating the identification data detected from said detection microchip.

7. The combination as recited in claim 6 wherein said detection microchip is freely programmable to operate in said function modes.

8. The combination of a portable, field-programmable detection microchip for storing identification data for identifying persons, animals or objects, and a read/write device for accessing the data stored in the microchip, when brought within RF coupling proximity thereof, the combination defining an identification system comprising:

a read/write device including a transmitter for producing an RF field, a modulator coupled to said transmitter for modulating the RF field, and a data receiver for receiving RF data signals from the detection microchip; and a detection microchip including
  i. a parallel LC resonant circuit tuned to the frequency of said RF field;
  ii. a rectifier circuit coupled to said parallel LC resonant circuit;
  iii. a charging capacitor coupled to said rectifier circuit for storing electrical energy during the occurrence of the RF field, and powering said microchip during pulse pauses of the RF field;
  iv. a signal receiver coupled to said parallel LC resonant circuit for decoding the modulated RF field;
  v. a memory circuit for storing the identification data of said microchip;
  vi. a code generator coupled to said memory circuit for generating an RF signal modulated with the identification data;
  vii. switching means coupled to said parallel LC resonant circuit and said code generator for coupling the identification data from said code generator to said parallel LC resonant circuit, said switching means changing the impedance of said parallel LC resonant circuit during the transmission of the identification data, wherein said signal receiver of said microchip additionally including a decoder circuit; and
  viii. a digital multiplexer switch coupled between said decoder circuit and said memory circuit for selectively connecting said decoder circuit to said memory circuit during a transmission of identification data from said read/write device; said decoder circuit receiving a pulse pause modulated (PPM) RF field from said modulator of said read/write device and digitally evaluating the PPM RF field and the data in order to change the identification data stored in said memory circuit, said digital multiplexer disconnects said decoder circuit from said memory circuit during a transmission from said detection microchip.

* * * * *